(12) United States Patent
Okawa et al.

(10) Patent No.: US 7,954,984 B2
(45) Date of Patent: Jun. 7, 2011

(54) INTERIOR LAMP

(75) Inventors: Yuichi Okawa, Tokyo (JP); Han O, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 349 days.

(21) Appl. No.: 12/143,968

(22) Filed: Jun. 23, 2008

(65) Prior Publication Data
US 2008/0316740 A1    Dec. 25, 2008

(30) Foreign Application Priority Data
Jun. 22, 2007    (JP) .................. 2007-165129

(51) Int. Cl.
*B60Q 1/00*  (2006.01)
*B60Q 1/26*  (2006.01)
*B60Q 11/00* (2006.01)

(52) U.S. Cl. .................. 362/488; 362/490; 362/493

(58) Field of Classification Search .................. 362/488, 362/490, 493
See application file for complete search history.

(56) References Cited

U.S. PATENT DOCUMENTS

| | | | | |
|---|---|---|---|---|
| 4,499,528 | A * | 2/1985 | Hawlitzki | 362/275 |
| 5,508,897 | A * | 4/1996 | Van Order | 362/490 |
| 6,945,678 | B2 * | 9/2005 | Sugihara et al. | 362/490 |
| 2001/0015780 | A1 * | 8/2001 | Yamaguchi | 349/112 |

FOREIGN PATENT DOCUMENTS

| | | |
|---|---|---|
| JP | H10-194041 A | 7/1998 |
| JP | 2003127769 A | 5/2003 |

* cited by examiner

*Primary Examiner* — Jong-Suk (James) Lee
*Assistant Examiner* — David J Makiya
(74) *Attorney, Agent, or Firm* — Kenealy Vaidya LLP

(57) ABSTRACT

An interior lamp can achieve both an excellent illumination function and an excellent illumination effect (providing a comfortable environment) and may possibly provide high merchandizability characteristics. The interior lamp can include an LED light source unit having a substrate and a plurality of white LED lamps and colored LED lamps mounted on the substrate. A cover case can be provided to serve as a light illumination unit. The light illumination unit can include a double-layer structure having a light diffusion layer and a light transmission layer. The light diffusion layer can have a plurality of penetrating holes. The light transmission layer can have a plurality of convex lens portions. The center axes of the penetrating holes and the corresponding lens portions can coincide with corresponding optical axes of the white LED lamps, respectively. The white light from the white LED lamps can be converged by the respective lens portions of the light transmission layer to be radiated outside as spot light(s). The colored light from the colored LED lamps can be diffused through the light diffusion layer to be radiated outside as diffused light.

15 Claims, 5 Drawing Sheets

INTERIOR LAMP

This application claims the priority benefit under 35 U.S.C. §119 of Japanese Patent Application No. 2007-165129 filed on Jun. 22, 2007 which is hereby incorporated in its entirety by reference.

BACKGROUND

1. Technical Field

The presently disclosed subject matter relates to interior lamps, and in particular, to an interior lamp configured for use in a vehicle that can radiate light with different color tones and light qualities.

2. Related Art

Conventional interior lamps have been proposed, which include the following structures. One of such structures is configured to include a cover lens and two types of light sources which are a white illumination lamp and a colored illumination lamp. In this structure, the white illumination lamp is arranged closer to the cover lens than the colored illumination lamp (for example, see Japanese Patent Application Laid-Open No. Hei 10-194041). According to this structure, white light emitted from the white illumination lamp is radiated through the cover lens into a vehicle compartment without coloring the white light by the colored illumination lamp. In this instance, the white light from the white illumination lamp is used to, for example, serve as an overhead reading lamp while the colored light from the colored illumination lamp is used to serve as a foot light when a vehicle door is opened or closed.

Another example of a conventional device includes a structure that is configured to include a plurality of white LEDs arranged in a line, a light guide plate, and LEDs capable of emitting three primary colors (red, green and blue) which are arranged on both sides of the light guide plate (see, for example, Japanese Patent Application Laid-Open No. 2003-127769). White light is emitted from the white LEDs. Red light, green light, and blue light are emitted from the three primary color LEDs, respectively, and are guided through the light guide plate. Then, the white light and R, G, and B light are combined and adjusted to be mixed into a desired mixed light (including pseudo white light) and reflected by a reflector to be directed to a lens. The reflected light (indirect light) is radiated through the lens into a vehicle compartment.

In this instance, the white light from the white LEDs is used so that the vehicle compartment is brightly illuminated therewith. The colored light or pseudo white light from three primary color LEDs can be used for illuminating the vehicle compartment with light that is relatively not so bright, or for imparting an illumination effect of one's taste.

The interior lamp disclosed in Japanese Patent Application Laid-Open No. Hei 10-194041 can illuminate a vehicle compartment with light which is formed by white light and colored light through the same cover lens. Accordingly, even when the light tone is switched from white to a certain color other than white and vice versa, the light quality is not changed. With this illumination light, certain illumination effects (providing comfortable environment, etc.) cannot be achieved sufficiently, resulting in lack of merchandizability.

The interior lamp disclosed in Japanese Patent Application Laid-Open No. 2003-127769 can illuminate the vehicle compartment with white light from the white LEDs, primary color light from each of the three primary colored LEDs, or mixed light (including pseudo white light) of R, G, B light through the same lens. Accordingly, as in the case disclosed in Japanese Patent Application Laid-Open No. Hei. 10-194041, the interior lamp disclosed in Japanese Patent Application Laid-Open No. 2003-127769 results in insufficient merchandizability.

Furthermore, the light with which the vehicle compartment is illuminated is an indirect light which is reflected once by the reflector. Accordingly, in this case the reflection loss may deteriorate light utilization efficiency. Namely, there is a problem in which the light intensity may be reduced.

SUMMARY

In view of the foregoing characteristics, features, and problems associated with conventional interior lamps, an aspect of the presently disclosed subject matter is to provide an interior lamp which can radiate light having a light quality varied by the mixture of emitted light colors (white light and colored light) and which can illuminate a vehicle compartment with white light that is brighter than the case of colored light to a large extent.

Furthermore, another aspect of the presently disclosed subject matter is to provide an interior lamp that can achieve both an excellent illumination function and excellent illumination effect (e.g., providing a comfortable environment, etc.) and possibly provide high merchandizability.

Still another aspect of the presently disclosed subject matter is to provide an interior lamp including: an LED light source unit having a substrate and a plurality of white LED lamps with respective optical axes and a plurality of colored LED lamps which are mounted on the substrate, with a specified illumination direction; and a light illumination unit arranged forward in the illumination direction of the LED light source unit, the light illumination unit configured to control white light emitted from the white LED lamps and colored light emitted from the colored LED lamps to radiate the controlled light to the outside, the light illumination unit including at least two layers of a light diffusion layer and a light transmission layer, the light diffusion layer having a plurality of penetrating holes having respective center axes, the light transmission layer having a plurality of lens portions having respective center axes, the center axes of the penetrating holes of the light diffusion layer and the lens portions of the light transmission layer being arranged on or near the optical axes of the white LED lamps correspondingly.

In the interior lamp configured as described above, each of the lens portions can be convex in a direction toward the light diffusion layer, and at least part of the lens portion can be positioned in the corresponding penetrating hole of the light diffusion layer.

In another aspect of the interior lamp configured as described above, each of the lens portions can be convex in a direction opposite to the light diffusion layer.

In still another aspect of the interior lamp configured as described above, the lens portions can each be convex in both directions toward and opposite to the light diffusion layer, and at least part of the lens portion can be positioned in the corresponding penetrating hole of the light diffusion layer.

In the interior lamp configured as described above, the light diffusion layer can be disposed near the LED light source unit and the light transmission layer can be disposed farther away from the LED light source unit than the light diffusion layer in the illumination direction.

In another aspect of the interior lamp configured as described above, the light transmission layer can be disposed near the LED light source unit and the light diffusion layer can be disposed farther away from the LED light source unit than the light transmission layer in the illumination direction.

In the interior lamp configured as described above, the white LED lamp can be an LED lamp which can emit white light or pseudo white light having a tone close to white, the LED lamp including an LED element emitting a predetermined colored light and a wavelength conversion material which can be excited by the predetermined colored light to emit complementary colored light thereto.

In the interior lamp configured as described above, the colored LED lamp can be an LED lamp which can emit colored light different in tone from the light emitted from the white LED lamp.

In accordance with another aspect of the presently disclosed subject matter, an interior lamp can include: an LED light source unit having a substrate and a plurality of white LED lamps and colored LED lamps mounted on the substrate; and a light illumination unit (for example, composed of a cover case) arranged forward in the illumination direction of the LED light source unit. The light illumination unit can include a double-layer structure which is composed of a light diffusion layer and a light transmission layer. The light diffusion layer can have a plurality of penetrating holes formed therethrough. The light transmission layer can have a plurality of lens portions provided at positions corresponding to the penetrating holes and projected in one direction (toward the light diffusion layer or opposite thereto). In this interior lamp, the center axes of the penetrating holes of the light diffusion layer and the corresponding lens portions of the light transmission layer can be made to coincide with the corresponding optical axes of the white LED lamps, respectively.

According to this configuration, almost all of the white light (or pseudo white light) emitted from the white LED lamps can be converged by the respective lens portions of the light transmission layer to be radiated outside as spot light. On the other hand, the colored light emitted from the colored LED lamps can be diffused through the light diffusion layer to be radiated outside as diffused light.

As a result, the interior lamp can provide a clear spot light with white light (or pseudo white light) from the white LED lamps when brighter light is required, for example, during reading books in a vehicle compartment. On the other hand, the interior lamp can also provide soft light obtained by diffusing colored light from the colored LED lamps when a special illumination effect is required in the vehicle compartment. In other words, according to the presently disclosed subject matter, interior lamps can be realized which can achieve both superior illumination function and illumination effect (providing a comfortable environment) and may also provide high merchandizability.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

Figure 1:
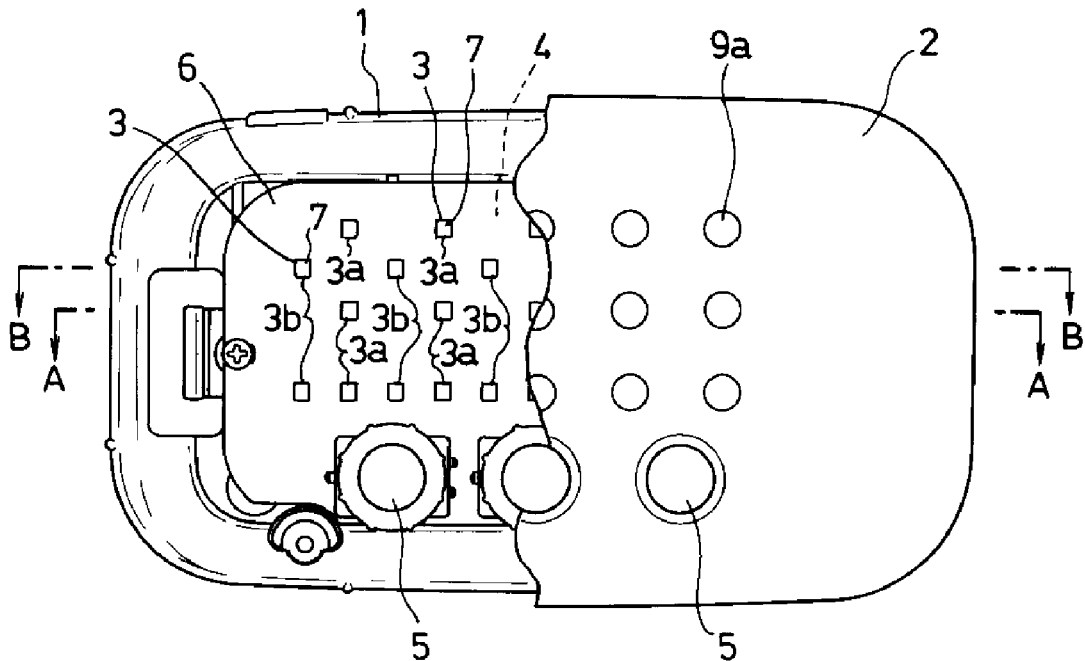
FIG. 1 is a plan view, part of which is cut away, showing one exemplary embodiment of an interior lamp made in accordance with principles of the presently disclosed subject matter.

Hereinafter, a description will be given of several exemplary embodiments with reference to FIG. 1 through FIG. 10. In the shown exemplary embodiments, the same or similar parts are denoted by the same reference numerals/symbols.

FIG. 1 is a plan view, part of which is cut away, showing one exemplary embodiment of an interior lamp made in accordance with the principles of the presently disclosed subject matter. The interior lamp can include a housing case 1, a cover case 2 serving as a light illumination unit, and a part mounting substrate 6 serving as an LED light source unit. The part mounting substrate 6 can include LED lamps 3 as light sources, electronic components 4 (not shown, such as resistors), and operation components 5 (such as switches) which are mounted thereon. The housing case 1 and the cover case 2 can form a closed space serving as a lighting chamber 10. In this closed space, the part mounting substrate 6 can be securely supported while the light emitting surface 7 of the LED lamps 3 faces toward the cover case 2.

The LED lamps 3 can be positioned on the part mounting substrate 6. The LED lamps 3 can include a plurality of white LED lamps 3a and a plurality of colored LED lamps 3b. The white LED lamp 3a can emit white light or light having a tone near white light (or pseudo white light). Hereinafter, the white light and light having a tone near white light may be collectively referred to as "white light" for simplifying the description. The colored LED lamp 3b can emit light having a tone other than white. The white LED lamps 3a and the colored LED lamps 3b can be arranged at predetermined intervals therebetween on the substrate.

In this instance, the white LED lamp 3a may be composed of an LED element as a light emitting body and a wavelength conversion material such as a phosphor in combination. Examples of the combinations are described as follows.

When the LED element is a blue LED element which can emit blue light, a yellow phosphor can be used which can wavelength convert the blue light into yellow light through the excitation by the blue light (the color of yellow is complementary to blue). In this system, part of the blue light emitted from the blue LED element can excite the yellow phosphor so that the phosphor emits yellow light, and then the yellow light and the blue light are mixed to provide light having a tone near white light by the function of additive color mixture.

In another example, a combination of a blue LED element and two types of phosphors can be used. One of the phosphors can be excited by blue light to wavelength-convert and emit green light while the other can be excited by blue light to wavelength-convert and emit red light. In this system, part of the blue light emitted from the blue LED element can excite the phosphors so that the phosphors emit green light and red light, respectively, and then the green and red light and the blue light are mixed to provide light having a tone near white light by additive color mixture.

In a case where the LED element is a UV LED element which can emit UV light, three kinds of phosphors can be used. The phosphors can be excited by the UV light to wavelength-convert and emit blue light, green light and red light, respectively. In this system, part of the UV light emitted from the UV LED element can excite the phosphors so that the phosphors emit blue light, green light and red light, respectively, and then the blue, green and red light are mixed to provide light having a tone near white light by additive color mixture.

The colored LED lamp 3b that is used can be any LED lamp which can emit light having a desired tone by appropriately combining a certain type of LED element and wavelength conversion material(s) designed to be excited so as to wavelength-convert and emit required colored light, or by providing a certain color emitting LED element itself without wavelength conversion material. The colored light emitted from the colored LED lamp 3b may be any primary colored light or any mixed light by the combinations of LED elements and phosphors.

Figure 2:
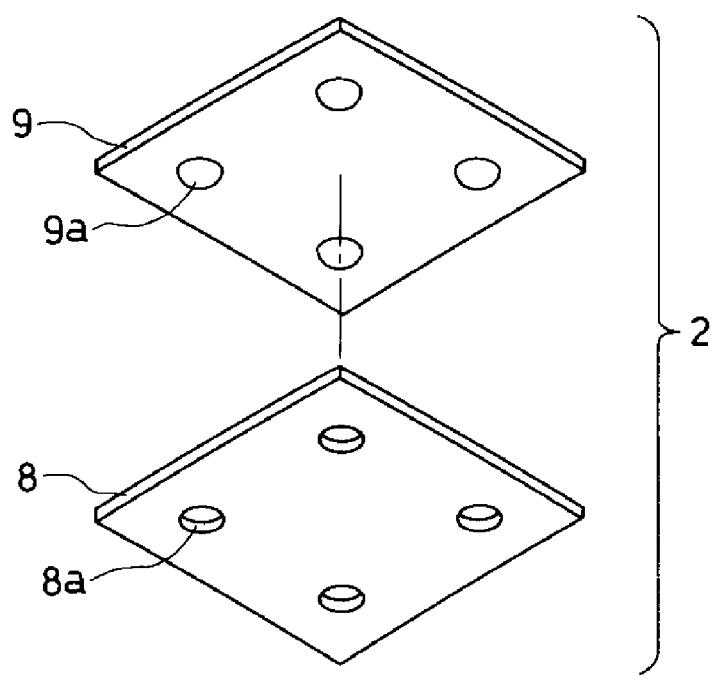
FIG. 2 is a diagram showing a part of the configuration of a cover case serving as a light illumination unit in one exemplary embodiment.

The cover case 2 can be disposed in the illumination direction of the LED lamps 3. In the exemplary embodiment, the cover case 2 can have a double-layer structure with two kinds of materials, as shown in FIG. 2. The cover case 2 is configured to include, for example, a light diffusion layer 8 disposed near the LED lamps 3 and a light transmission layer 9 disposed farther away from the LED lamps 3 than the light diffusion layer 8 in the illumination direction. The light diffusion layer 8 can be formed of a translucent white resin material (for example, a material containing a light diffusion agent). The light transmission layer 9 can be formed of a light-transmitting resin material.

A plurality of penetrating holes, or LED light passing holes 8a, can be provided through the light diffusion layer 8 at regular intervals in transverse and longitudinal directions. Furthermore, a plurality of lens portions 9a can be formed in the light transmission layer 9 so as to correspond to the LED light passing holes 8a of the light diffusion layer 8, respectively. In this instance, the lens portions 9a can be formed to have a curved surface (to be convex) projecting toward the LED light passing holes 8a of the light diffusion layer 8. In this case, the lens portions 9a of the light transmission layer 9 are positioned in the corresponding LED light passing holes 8a of the light diffusion layer 8.

Figure 3:
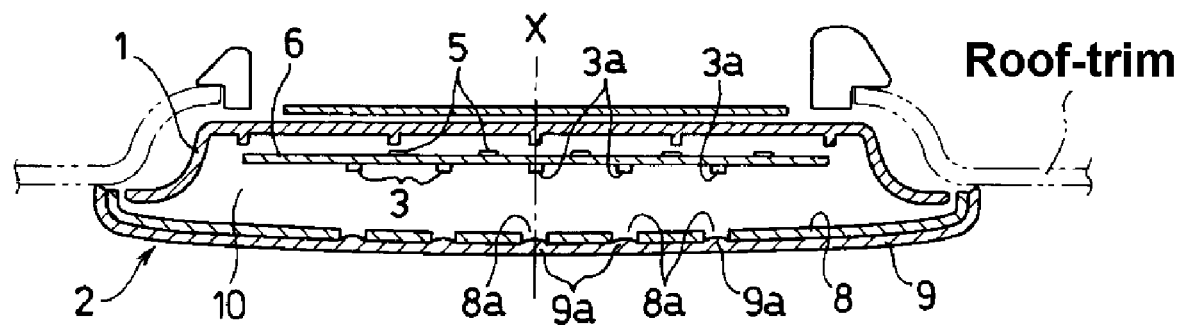
FIG. 3 is a cross-sectional view of FIG. 1 taken along line A-A.

As shown in FIG. 3 which is a cross-sectional view of FIG. 1 taken along line A-A, the housing case 1 and the cover case 2 can form a closed space or the lighting chamber 10. In this lighting chamber 10, the part mounting substrate 6 can be securely supported. In this structure, the center axes of the LED light passing holes 8a of the light diffusion layer 8 and the corresponding lens portions 9a of the light transmission layer 9 which constitute the cover case 2 coincide with or are arranged near the optical axis X of the white LED lamp mounted on the part mounting substrate 6, correspondingly.

Figure 4:
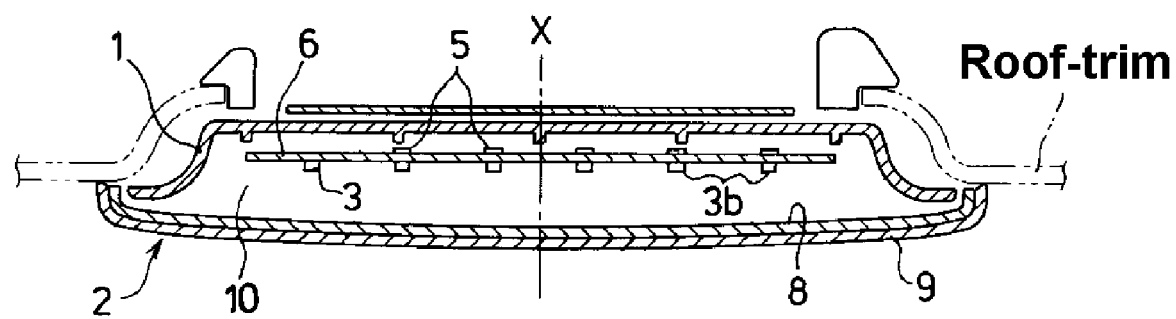
FIG. 4 is a cross-sectional view of FIG. 1 taken along line B-B.
Figure 5:
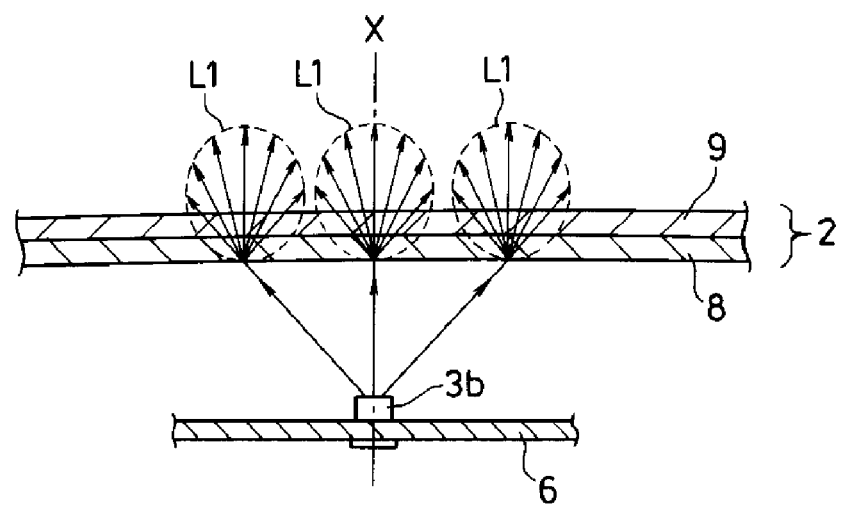
FIG. 5 is a partial enlarged cross-sectional view of FIG. 4.

On the other hand, as shown in FIG. 4 which is a cross-sectional view of FIG. 1 taken along line B-B, any of LED light passing holes 8a of the light diffusion layer 8 and lens portions 9a of the light transmission layer 9 are not provided in the cover case 2 near the optical axes X of the colored LED lamps 3b mounted on the part mounting substrate 6.

It should be noted that operation components (not shown) may be mounted on the same side of the part mounting substrate 6 as the LED lamps 3. Further, the electronic components 4 may be mounted on the other side of the part mounting substrate 6 opposite to the side where the lamps 3 are mounted.

In the interior lamp configured as described above, as shown in FIG. 5 (which is the cross-sectional view of FIG. 4, but inverted vertically), almost all the colored light emitted from the colored LED lamps 3b reaches the light diffusion layer 8 of the cover case 2, and then is diffused by the light diffusion layer 8 to become diffused light L1 which reaches the light transmission layer 9. The diffused light L1 then enters the light transmission layer 9 to be guided therethrough and radiated to the outside.

As a result, the colored light radiated from the interior lamp can provide a soft light quality with a relatively uniform surface intensity distribution. This can enhance the illumination effect (providing a comfortable environment) in the vehicle compartment.

Figure 6:
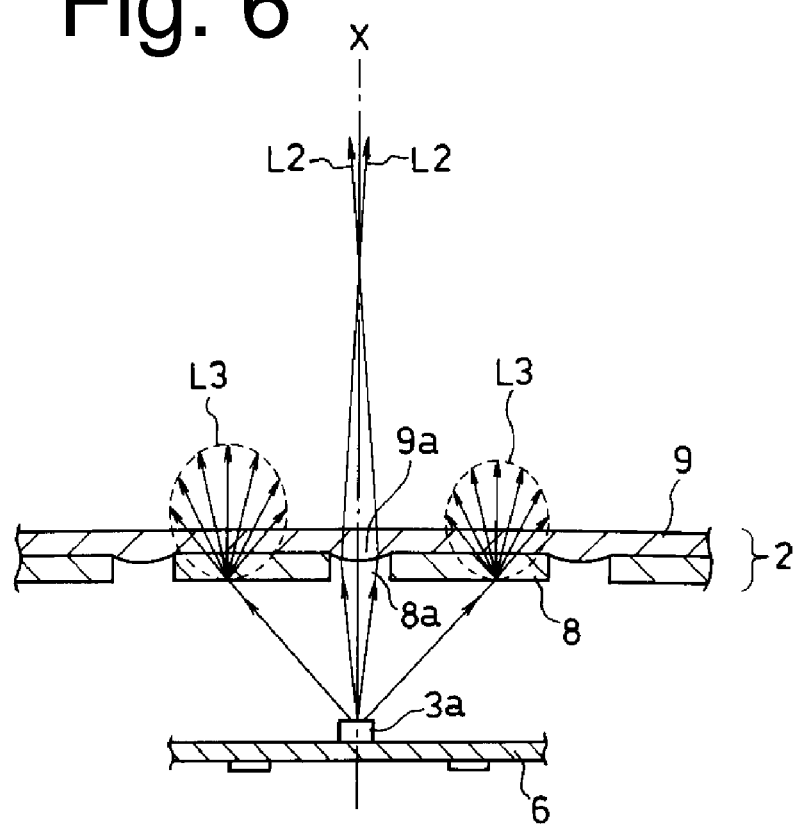
FIG. 6 is a partial enlarged cross-sectional view of FIG. 3.

On the contrary, as shown in FIG. 6 (which is the cross-sectional view of FIG. 5, but inverted vertically), the white light emitted from the white LED lamps 3a results in light L2 emitted along and around the optical axis X and having a large luminous flux density which can pass through the LED light passing holes 8a of the light diffusion layer 8 of the cover case 2. Then, the light L2 reaches the corresponding lens portions 9a of the light transmission layer 9 to be converged for illumination.

Part L3 of the white light emitted from the white LED lamps 3a in a direction away from the optical axis X can reach the light diffusion layer 8 as in the case of the colored light described above. The light L3 can be diffused by the light diffusion layer 8 and reaches the light transmission layer 9 to be guided therethrough and radiated to the outside as diffused light L3.

As a result, the white light radiated by the interior lamp can provide spot light converged by the lens portions 9a with a bright and brilliant light quality. This can achieve a specific illumination function, for example, for serving as an overhead reading lamp. Furthermore, part of the white light radiated by the interior lamp, or diffused light, can provide a soft light quality with a relatively uniform surface intensity distribution. This can enhance the illumination effect (providing a comfortable environment) in the vehicle compartment.

It should be noted that the white LED lamps 3a and the colored LED lamps 3b can be independently turned on as a group to alter the tone and light quality of the light for different illumination effects. The presently disclosed subject matter, however, is not limited to this. For example, the colored LED lamps 3b can be composed of three primary color LED lamps, or R, G, and B LED lamps. When they are simultaneously turned on, the mixed light can be used as white light (pseudo white light). In this case, if all of the R, G and B LED lamps and the white LED lamps are turned on, brighter white light can be obtained by the combination of the white spot light from the white LED lamps 3a and the diffused (pseudo) white light from the colored LED lamps 3b.

In the above embodiments, the lens portions 9a formed in the light transmission layer 9 each have a curved surface projecting toward the LED light passing holes 8a of the light diffusion layer 8. However, the presently disclosed subject matter is not limited thereto.

Figure 7:
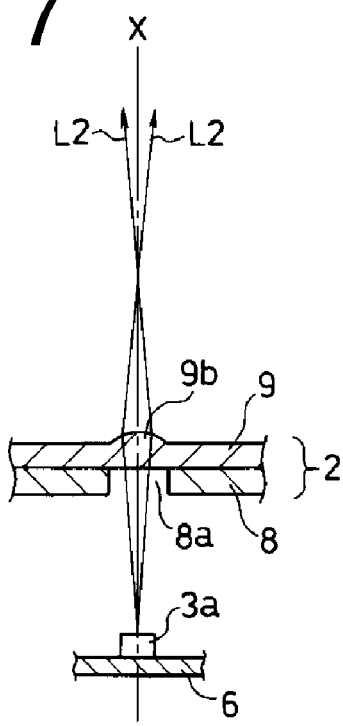
FIG. 7 is a partial enlarged cross-sectional view showing another exemplary embodiment of a lens portion of the light transmission layer.

As shown in FIG. 7, for example, lens portions 9b formed in the light transmission layer 9 can have a curved surface projecting in an opposite direction to the LED light passing holes 8a of the light diffusion layer 8 at the corresponding positions. In this case, as in the previous embodiment, the white light emitted from the white LED lamps 3a can result in light L2 emitted along and around the optical axis X and having a large luminous flux density which can pass through the LED light passing holes 8a of the light diffusion layer 8 of the cover case 2. Then, the light L2 reaches and enters the light transmission layer 9 and is guided to the corresponding lens portions 9a thereof to be converged for illumination.

Figure 8:
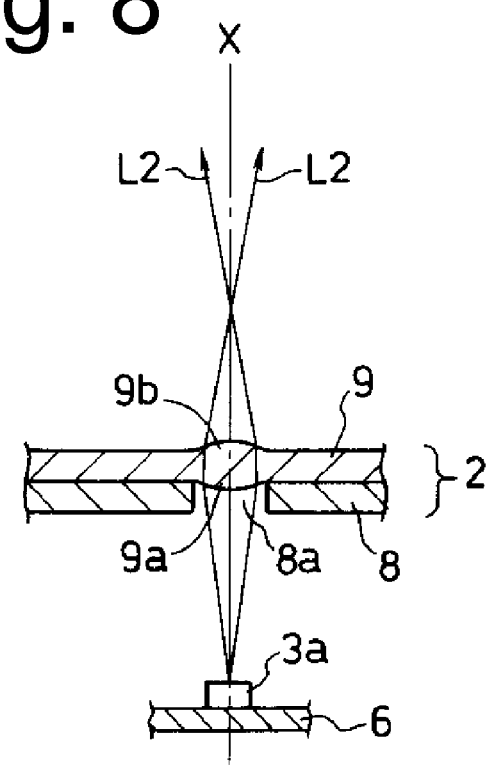
FIG. 8 is a partial enlarged cross-sectional view showing still another exemplary embodiment of a lens portion of the light transmission layer.

As shown in FIG. 8, a still further modified example includes lens portions formed in the light transmission layer 9 on both sides thereof which can have curved surfaces 9a and 9b projecting in the directions toward and opposite to the LED light passing holes 8a of the light diffusion layer 8 at corresponding positions. The lens portions 9a of the light transmission layer 9 are positioned in the corresponding LED light passing holes 8a of the light diffusion layer 8 as in the embodiment of FIG. 6. In this case, as in the previous embodiment, the white light emitted from the white LED lamps 3a results in light L2 that is emitted along and around the optical axis X and which has a large luminous flux density and which passes through the LED light passing holes 8a of the light diffusion layer 8 of the cover case 2. Then, the light L2 reaches the corresponding lens portions 9a of the light transmission layer 9 and is converged and guided to the corresponding lens portions 9b thereof to be converged for illumination.

In the above embodiments, the light diffusion layer 8 is disposed near the LED lamp 3 and the light transmission layer 9 is disposed farther away from the LED lamp 3 than the light diffusion layer 8 in the illumination direction. However, the presently disclosed subject matter is not limited thereto. The positional relationship of the double-layer structure can be changed. Namely, the light transmission layer 9 can be disposed near the LED lamp and the light diffusion layer 8 can be disposed farther away from the LED lamp than the light transmission layer 9 in the illumination direction.

Figure 9:
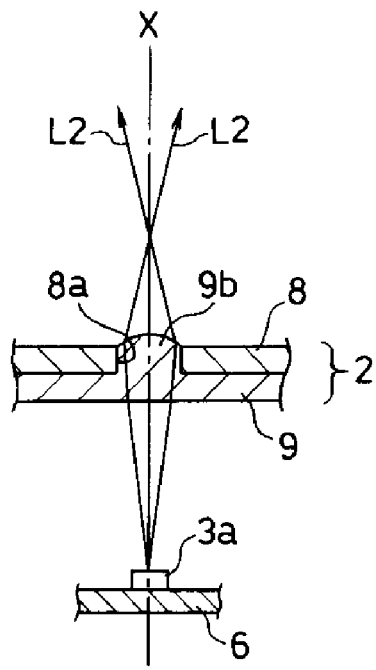
FIG. 9 is a partial enlarged cross-sectional view showing another exemplary embodiment of a cover case.

In this case, as shown in FIG. 9, the plurality of lens portions 9b can be formed in the light transmission layer 9 at positions corresponding to the respective LED light passing holes 8a of the light diffusion layer 8. Furthermore, the lens portions 9b can have a curved surface projecting toward the LED light passing holes 8a of the light diffusion layer 8. Accordingly, at least part of the lens portions 9b may be positioned in the LED light passing holes 8a of the light diffusion layer 8. In the illustrated example, the lens portion 9b fills the LED passing hole 8a, though the presently disclosed subject matter is not limited thereto.

In this configuration, the white light emitted from the white LED lamps 3a results in light L2 being emitted along and around the optical axis X and having a large luminous flux density which can reach the light transmission layer 9 of the cover case 2 first, and then enter and be guided to the lens portions 9a positioned within the LED light passing holes 8a of the light diffusion layer 8. Then, the light L2 can be converged by the corresponding lens portions 9a of the light transmission layer 9 for illumination.

Figure 10:
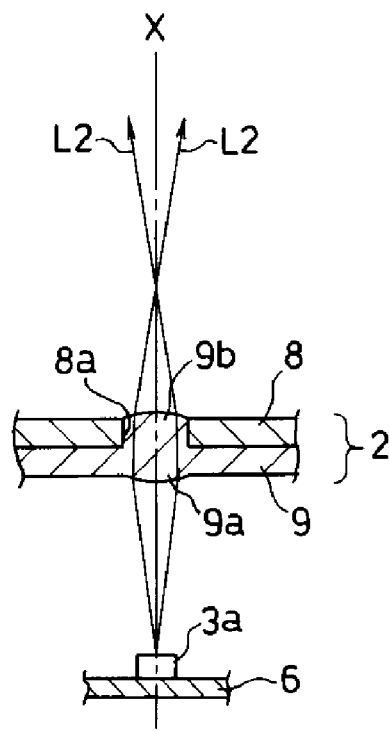
FIG. 10 is a partial enlarged cross-sectional view showing still another exemplary embodiment of a cover case.

In another modified example, as shown in FIG. 10, the plurality of lens portions 9a and 9b can be formed in the light transmission layer 9 at positions corresponding to the respective LED light passing holes 8a of the light diffusion layer 8. Furthermore, the lens portions 9a and 9b can have curved surfaces projecting in the directions toward and opposite to the LED light passing holes 8a of the light diffusion layer 8. The lens portions 9b of the light transmission layer 9 are positioned in the corresponding LED light passing holes 8a of the light diffusion layer 8 as in the previous embodiment.

In this configuration, the white light emitted from the white LED lamps 3a results in light L2 being emitted along and around the optical axis X and having a large luminous flux density which can reach the lens portions 9a of the light transmission layer 9 of the cover case 2 first, and then enter and be converged by the lens portions 9a. Then the light L2 is guided through the light transmission layer 9 to reach the lens portions 9b on the other side. Then, the light L2 is further converged by the lens portions 9b of the light transmission layer 9 for illumination.

Accordingly, in the configurations shown in FIG. 7 through FIG. 10, the white light emitted from the white LED lamps 3a results in light L2 emitted along and around the optical axis X and having a large luminous flux density which can form a spot light with bright and brilliant light quality. Furthermore, as in the previous exemplary embodiments, the light emitted from the colored LED lamps 3b can provide diffused light having a soft light quality with a relatively uniform surface intensity distribution.

In the above embodiments, the cover case has a double-layer structure including a light diffusion layer and a light transmission layer. However, the presently disclosed subject matter is not limited thereto. The cover case may have multi-layer structures including another functional layer(s) such as a protection layer, a filtering layer, etc. in addition to the above described layers.

As described above, the interior lamp can provide clear spot light with white light (or pseudo white light) from the white LED lamps when brighter light is required, for example, during reading books in a vehicle compartment. On the other hand, the interior lamp can also provide soft light obtained by diffusing colored light from the colored LED lamps when a special illumination effect is required in the vehicle compartment. In other words, a single interior lamp can achieve both a superior illumination function and illumination effect (providing a comfortable environment) and may possibly provide high merchandizability.

It will be apparent to those skilled in the art that various modifications and variations can be made in the present invention without departing from the spirit or scope of the invention. Thus, it is intended that the present disclosure cover the modifications and variations of this invention provided they come within the scope of the appended claims and their equivalents. All related and conventional art references described above are hereby incorporated in their entirety by reference.

What is claimed is:

1. An interior lamp comprising:
an LED light source unit having a substrate and a plurality of white LED lamps with respective optical axes and a plurality of colored LED lamps which are located adjacent the substrate, the LED light source unit having a specified illumination direction; and
a light illumination unit arranged forward in the illumination direction of the LED light source unit and configured to control white light emitted from the white LED lamps and colored light emitted from the colored LED lamps to create a controlled light and to radiate the controlled light to an exterior area, the light illumination unit including at least a light diffusion layer and a light transmission layer, the light diffusion layer having a plurality of penetrating holes having respective center axes, the light transmission layer having a plurality of lens portions having respective center axes, the center axes of the penetrating holes of the light diffusion layer and the lens portions of the light transmission layer being aligned with respective optical axes of the white LED lamps correspondingly,
wherein the lens portions are each convex in the direction of the light diffusion layer, and at least part of each of the lens portions is positioned in a corresponding one of the plurality of penetrating holes of the light diffusion layer.

2. The interior lamp according to claim 1, wherein the lens portions are each convex in a direction opposite to the light diffusion layer.

3. The interior lamp according to claim 1, wherein the light diffusion layer is disposed near the LED light source unit and the light transmission layer is disposed farther away from the LED light source unit than the light diffusion layer in the illumination direction.

4. The interior lamp according to claim 1, wherein the light diffusion layer is disposed near the LED light source unit and the light transmission layer is disposed farther away from the LED light source unit than the light diffusion layer.

5. The interior lamp according to claim 2, wherein the light diffusion layer is disposed near the LED light source unit and the light transmission layer is disposed farther away from the LED light source unit than the light diffusion layer in the illumination direction.

6. The interior lamp according to claim 1, wherein the light transmission layer is disposed near the LED light source unit and the light diffusion layer is disposed farther away from the LED light source unit than the light transmission layer in the illumination direction.

7. The interior lamp according to claim 1, wherein the light transmission layer is disposed near the LED light source unit and the light diffusion layer is disposed farther away from the LED light source unit than the light transmission layer.

8. The interior lamp according to claim 2, wherein the light transmission layer is disposed near the LED light source unit and the light diffusion layer is disposed farther away from the LED light source unit than the light transmission layer in the illumination direction.

9. The interior lamp according to claim 1, wherein the white LED lamp is an LED lamp configured to emit white light or pseudo white light having a color tone close to white, the LED lamp including an LED element emitting a predetermined colored light and a wavelength conversion material which can be excited by the predetermined colored light to emit a complementary colored light complementary to the predetermined colored light.

10. The interior lamp according to claim 1, wherein the colored LED lamp is an LED lamp configured to emit colored light different in tone from the white light emitted from the white LED lamp.

11. The interior lamp according to claim 1, wherein the lamp is configured for use in a vehicle cabin.

12. The interior lamp according to claim 1, wherein the plurality of white LED lamps and plurality of colored LED lamps are mounted on the substrate.

13. An interior lamp comprising:
a substrate;
at least one white LED lamp configured to emit light having a first wavelength, the at least one white LED lamp located adjacent the substrate and having an optical axis extending in an illumination direction;
at least one colored LED lamp configured to emit light having a wavelength different than the first wavelength of light emitted from the white LED lamp, the at least one colored LED lamp located adjacent the substrate and having an optical axis;
a light diffusion layer located adjacent the substrate and having at least one penetrating hole having a center axis; and
a light transmission layer located adjacent the light diffusion layer, the light transmission layer having at least one lens portion shaped differently than a remainder portion of the transmission layer and having a center axis, the at least one penetrating hole of the light diffusion layer and the lens portion of the light transmission layer are located such that the optical axis of the at least one white LED lamp aligns with the center axis of the at least one penetrating hole of the light diffusion layer and the lens portion of the light transmission layer,
wherein the lens portion is convex in the direction of the light diffusion layer, and at least part of the lens portion is positioned in the penetrating hole of the light diffusion layer.

14. The interior lamp according to claim 13, wherein the lens portion is convex in a direction opposite to the light diffusion layer.

15. The interior lamp according to claim 13, wherein the diffusion layer includes a first solid material and the transmission layer includes a second solid material, and wherein the optical axis of the at least one colored LED lamp intersects both the first solid material and second solid material.

* * * * *